US011736324B2

(12) United States Patent
Hu et al.

(10) Patent No.: US 11,736,324 B2
(45) Date of Patent: Aug. 22, 2023

(54) METHOD AND APPARATUS FOR UNDERWATER ACOUSTIC COMMUNICATION

(71) Applicant: INSTITUTE OF GEOLOGY AND GEOPHYSICS, THE CHINESE ACADEMY OF SCIENCES, Beijing (CN)

(72) Inventors: Yaoxing Hu, Beijing (CN); Chunlei Zhao, Beijing (CN); Xiqiang Xu, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/098,114

(22) Filed: Jan. 18, 2023

(65) Prior Publication Data

US 2023/0171136 A1    Jun. 1, 2023

Related U.S. Application Data

(63) Continuation of application No. PCT/CN2022/076977, filed on Feb. 19, 2022.

(30) Foreign Application Priority Data

Mar. 31, 2021   (CN) .......................... 202110346558.5

(51) Int. Cl.
*H04L 27/00* (2006.01)
*H04B 13/02* (2006.01)
*H04L 27/26* (2006.01)

(52) U.S. Cl.
CPC ......... *H04L 27/0014* (2013.01); *H04B 13/02* (2013.01); *H04L 27/2605* (2013.01)

(58) Field of Classification Search
CPC . H04L 27/0014; H04L 27/2605; H04B 13/02; G03B 17/08; G02B 23/22
See application file for complete search history.

(56) References Cited

U.S. PATENT DOCUMENTS

| 5,331,602 A | * | 7/1994 | McLaren | ................. G01S 5/30 367/134 |
| 5,894,450 A | * | 4/1999 | Schmidt | ................. H04B 13/02 367/133 |
| 2015/0139343 A1 | | 5/2015 | Chen et al. | |

FOREIGN PATENT DOCUMENTS

| CN | 1288330 A | * | 3/2001 | ............ H03M 13/15 |
| CN | 101455008 B | * | 10/2012 | ........... H04B 1/7183 |

(Continued)

OTHER PUBLICATIONS

Huyong; Preamble Detection for Underwater Acoustic Communications based on Convolutional Neural Networks (Year: 2018).*

(Continued)

*Primary Examiner* — Daniel L Murphy
*Assistant Examiner* — Amie M Ndure

(57) ABSTRACT

A method and apparatus for underwater acoustic communication are disclosed. A data packet frame structure in the communication transmission includes a preamble, a synchronization code, and a data code. A guard interval is disposed between the preamble and the synchronization code. This method utilizes the different impact response environments of linear frequency modulation signals in different frequency bands to obtain the mapping relationships corresponding to the characteristics of the impulse responses in the frequency band, and adopts the quadrature phase shift keying (QPSK) modulation method to convert four groups of LMF signals with different center frequencies and the same modulation frequency, representing different symbols for signal transmission, where the LFM carrier (Continued)

signal of each center frequency can represent two bits of binary information to improve transmission efficiency. The apparatus for underwater acoustic communication also has the above-mentioned technical effects.

10 Claims, 3 Drawing Sheets

(56) References Cited

FOREIGN PATENT DOCUMENTS

| | | | | | |
|---|---|---|---|---|---|
| CN | 102939737 | A | * | 2/2013 | ........... H04L 1/1635 |
| CN | 103814538 | A | * | 5/2014 | ........... H04B 7/0689 |
| CN | 103947143 | A | * | 7/2014 | ......... H04L 27/2602 |
| CN | 105490976 | A | | 4/2016 | |
| CN | 107682297 | A | | 2/2018 | |
| CN | 108833055 | A | | 11/2018 | |
| CN | 109428845 | A | * | 3/2019 | ........... G01S 1/0428 |
| CN | 110048795 | A | | 7/2019 | |
| CN | 110830403 | A | | 2/2020 | |
| CN | 113162699 | A | | 7/2021 | |
| WO | 2020069530 | A1 | | 4/2020 | |

OTHER PUBLICATIONS

International Search Report issued in corresponding International application No. PCT/CN2022/076977, dated May 13, 2022.
Written Opinion of the International Searching Authority for No. PCT/CN2022/076977.

* cited by examiner

S1: performing, by a transmitting end, channel coding and digital modulation on a data source to obtain a data code; inserting a preamble, a synchronization code, and a guard interval before the data code to obtain a data packet; sending the data packet modulated to a carrier frequency having an orthogonal characteristic into an underwater acoustic channel through a transmission transducer S2: performing, by a receiving end, inverse modulation on a received underwater acoustic signal to obtain the data packet; decomposing the data packet and capturing and saving a useful signal based on the preamble; removing the guard interval and analyzing an optimal order of the data code in a fractional order domain according to the synchronization code; and demodulating the data code according to the optimal order to obtain a data output

FIG. 1

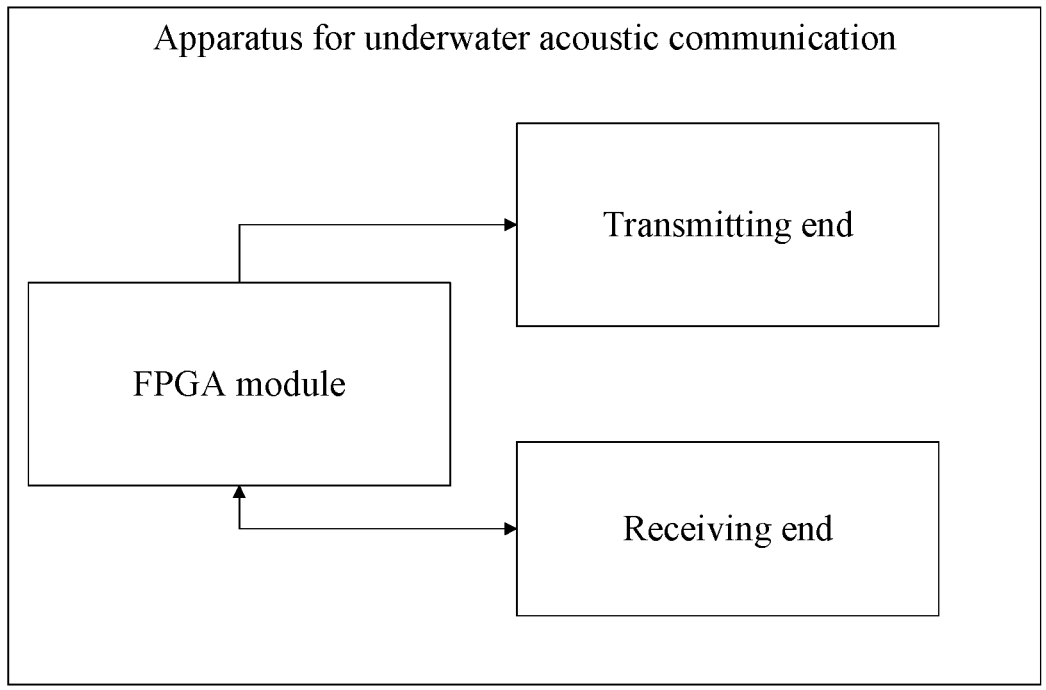

FIG. 2

METHOD AND APPARATUS FOR UNDERWATER ACOUSTIC COMMUNICATION

CROSS-REFERENCE TO RELATED APPLICATIONS

This application is a continuation of co-pending International Patent Application Number PCT/CN2022/076977, filed on Feb. 19, 2022, the disclosure of which is incorporated herein by reference in its entirety.

TECHNICAL FIELD

This disclosure relates to a method for underwater acoustic communication, and more particularly relates to a method for multi-node data communication in a SIMO underwater acoustic channel.

BACKGROUND

The description provided in this section is intended for the mere purpose of providing background information related to the present application but doesn't necessarily constitute prior art.

In seawater, because of the serious absorption and attenuation of electromagnetic waves and light waves when propagating in water, acoustic waves are currently the main way of propagating in water. When acoustic waves propagate in seawater, they will be greatly attenuated by various factors, and the underwater acoustic channel is complex and changeable and is subject to the Doppler frequency shift effect. In underwater acoustic communication, due to the influence of the reflection and refraction of sound waves on the water surface and water bottom, it may cause multipath effects at the receiving end. In addition, when implementing high-speed communication, the limited channel bandwidth and multi-channel transmission of signals will cause very serious inter symbol interference, resulting in serious bit errors of the received data. The acoustic waves emitted by the same sound source may be affected by the temperature, salinity, and depth of the seawater, and the time-varying and space-varying properties of the acoustic channel make the underwater acoustic information more complex than the radio channel.

In view of the many influencing factors in underwater acoustic communication, predecessors have used a variety of spread spectrum modulation techniques to solve the problems present in underwater acoustic communication. HE Chengbing et al. (Single-carrier high-speed spread-spectrum underwater acoustic communication method based on index modulation ZL202010882994) proposed a single-carrier high-speed spread-spectrum underwater acoustic communication method based on index modulation to improve the data rate of DSSS systems. However, when the intensity of external interference exceeds the interference tolerance of the system, the performance of the system will drop sharply. SHEN Xiaohong et al. (Mobile underwater acoustic communication method ZL2017107935278) proposed a FRFT-based OFDM underwater acoustic mobile communication system, using the Pei sampling algorithm as the discrete fractional Fourier transform algorithm, thereby reducing the complexity of the transmitter and receiver during the modulation and demodulation of subcarriers using FRFT. In addition, an order scanning iterative search algorithm module is added at the receiving end to deal with the Doppler frequency shift problem in underwater acoustic mobile communication. However, on the one hand, this method uses BPSK digital modulation in signal encoding, which may have issues of slow transmission efficiency and low spectrum utilization in high-speed underwater acoustic communication. Especially in the Single Input Multiple Output (SIMO) underwater acoustic environment, the subcarrier demodulation process through the fractional Fourier transform may result in a large system overhead, which cannot meet the needs of real-time communication.

SUMMARY

In view of the above, it is therefore a purpose of the present disclosure to provide a method and apparatus for underwater acoustic communication, aiming to solve the technical problem that the underwater acoustic signal is affected by the complexity of the environment and the multipath effect when propagating in the ocean.

In one aspect, there is provided a method for underwater acoustic communication, in which a data packet frame structure in the communication transmission according to the method includes: preamble, a synchronization code, and a data code. A guard interval is set between the preamble and the synchronization code. The preamble is used as the basis for the receiving end to judge the arrival of useful signals and prepare to receive data. The synchronization code adopts a linear frequency modulation signal having the same modulation frequency as and a different center frequency than the data code, as a synchronization detection signal of the useful signal arrival time T0 and the optimal order of receiving signals in the fractional domain. The data code comprises a plurality of different types of digital information modulated onto the linear frequency modulation signal.

The method includes the following steps:

S1: the transmitting end: performs channel coding and digital modulation on the data source to obtain the data code; inserts the preamble, the synchronization code and the guard interval before the data code to obtain the data packet; sends the data packet modulated to a carrier frequency having an orthogonal characteristic into an underwater acoustic channel through a transmission transducer;

S2: the receiving end: performs inverse modulation on the received underwater acoustic signal to obtain the data packet; decomposes the data packet and captures and saves the useful signal based on the preamble; removes the guard interval and analyzes the optimal order of the data code in the fractional order domain according to the synchronization code; demodulates the data code according to the optimal order to obtain data output.

In another aspect, there is provided an apparatus for underwater acoustic communication, in which a data packet frame structure in the communication transmission according to the method includes: preamble, a synchronization code, and a data code. A guard interval is set between the preamble and the synchronization code. The preamble is used as the basis for the receiving end to judge the arrival of useful signals and prepare to receive data. The synchronization code adopts a linear frequency modulation signal having the same modulation frequency as and a different center frequency than the data code, as a synchronization detection signal of the useful signal arrival time T0 and the optimal order of receiving signals in the fractional domain. The data code comprises a plurality of different types of digital information modulated onto the linear frequency modulation signal.

The apparatus for underwater acoustic communication includes: a transmitting end, a receiving end, and an FPGA module electrically connected to the two.

The FPGA module is used to detect the preamble information and notify the transmitting end and the receiving end.

The transmitting end: performs channel coding and digital modulation on the data source to obtain the data code; inserts the preamble, the synchronization code and the guard interval before the data code to obtain the data packet; sends the data packet modulated to a carrier frequency having an orthogonal characteristic into an underwater acoustic channel through a transmission transducer.

The receiving end: performs inverse modulation on the received underwater acoustic signal to obtain the data packet; decomposes the data packet and captures and saves the useful signal based on the preamble; removes the guard interval and analyzes the optimal order of the data code in the fractional order domain according to the synchronization code; and demodulates the data code according to the optimal order to obtain data output.

The present disclosure utilizes the linear frequency modulation signal to have different impact response environments in different frequency bands, and obtains the mapping relationships corresponding to the impact response characteristics in the frequency band. The quadrature phase shift keying QPSK modulation method is used to transmit the four sets of LMF signals with different center frequencies and the same modulation frequency, representing different symbols for signal transmission, where the LFM carrier signal of each center frequency can represent two bits of binary information to improve transmission efficiency.

BRIEF DESCRIPTION OF DRAWINGS

FIG. 1 is a flowchart of a method for underwater acoustic communication provided by Embodiment one of the present disclosure.

FIG. 2 is a block diagram of an apparatus for underwater acoustic communication provided by Embodiment two of the present disclosure.

DETAILED DESCRIPTION OF EMBODIMENTS

For a better understanding of the objectives, technical solutions, and advantages of the present disclosure, hereinafter the present disclosure will be described in further detail in connection with the accompanying drawing FIGS. 1-5 and some illustrative embodiments. It is to be understood that the specific embodiments described here are intended for the mere purposes of illustrating this disclosure, instead of limiting.

The specific implementation of the present disclosure will be described in detail below in connection with specific embodiments.

Embodiment One

FIG. 1 shows a flowchart of an underwater acoustic communication method provided by Embodiment one of the present disclosure. For ease of description, only the parts related to the embodiments of the present disclosure are shown, the details of which are as follows:

QPSK stands for quadrature phase shift keying; FPGA stands for field programmable logic gate array; SIMO stands for single-input multiple-output; OFDM stands for orthogonal frequency division multiplexing; BPSK stands for binary phase shift keying; LMF stands for a linear frequency modulation signal; ARM is an embedded microprocessor system; FRFT stands for Fractional Fourier transform; IQ modulator is a quadrature carrier modulator.

Figure 3:
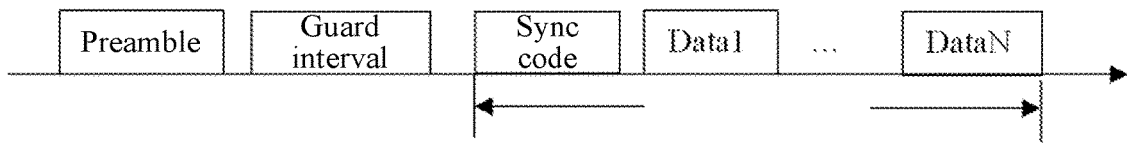
FIG. 3 is a schematic diagram of a data packet frame at the OFDM transmitting end of the method and apparatus for underwater acoustic communication of the present disclosure.

As shown in FIGS. 1 and 3, there is disclosed an underwater acoustic communication method, in which a data packet frame structure in the communication transmission according to the method includes: preamble, a synchronization code, and a data code. A guard interval is set between the preamble and the synchronization code. The preamble is used as the basis for the receiving end to judge the arrival of useful signals and prepare to receive data. The synchronization code adopts a linear frequency modulation signal having the same modulation frequency as and a different center frequency than the data code, as a synchronization detection signal of the useful signal arrival time T0 and the optimal order of receiving signals in the fractional domain, thus avoiding the problem of asynchronous acquisition of data caused by the asynchronous clocks of the transmitting end and the receiving end and by the influence of delay in underwater acoustic communication. The data code comprises a plurality of different types of digital information modulated onto the linear frequency modulation signal. The synchronization code and data code are used as an orthogonal frequency division multiplexing (OFDM) data packet to perform underwater acoustic signal transmission after carrier modulation.

The method includes the following steps:

S1: the transmitting end: performs channel coding and digital modulation on the data source to obtain the data code; inserts the preamble, the synchronization code and the guard interval before the data code to obtain the data packet; sends the data packet modulated to a carrier frequency having an orthogonal characteristic into an underwater acoustic channel through a transmission transducer;

S2: the receiving end: performs inverse modulation on the received underwater acoustic signal to obtain the data packet; decomposes the data packet and captures and saves the useful signal based on the preamble; removes the guard interval and analyzes the optimal order of the data code in the fractional order domain according to the synchronization code; demodulates the data code according to the optimal order to obtain data output.

Based on the data packet frame structure, the transmitting end modulates the data packet onto the subcarriers of the linear frequency modulation signal with the same modulation frequency but a different center frequency through serial-to-parallel conversion, then sends it out after superimposition, so as to realize low-speed to high-speed data transmission.

In some embodiments, step S1 includes:

S11: the transmitting end performs channel coding and digital modulation on the data source to obtain serial data;

S12: after serial/parallel conversion, parallel data is formed and pilot information is inserted. In the FRFT communication system, 00, 01, 10 and 11 in the QPSK modulation signals are respectively represented by four kinds of LFM carrier signals with different center frequencies, and after signal mapping is formed, IDFRFT is used to modulate the subcarrier to obtain the data code;

S13: add the guard interval before the modulated data code through parallel/serial conversion;

S14: insert a single-frequency signal before the guard interval as the preamble used as the basis for system collection;

S15: after the guard interval, insert a linear frequency modulation signal having the same modulation frequency and a different center frequency as the data code to serve as the synchronization code, and obtain the data packet after D/A conversion;

S16: send the data packet to an IQ modulator for modulation to a carrier frequency fc having an orthogonal characteristic, and then send the modulated data packet to the underwater acoustic channel through the transmission transducer.

In signal coding, compared with the binary phase shift keying (BPSK) digital modulation method that can only transmit one bit of data, the present disclosure utilizes the linear frequency modulation signal to have different impact response environments in different frequency bands, and obtains the mapping relationships corresponding to the impact response characteristics in the frequency band. As shown in steps S12-S15, the quadrature phase shift keying QPSK modulation method is used to transmit the four sets of LMF signals with different center frequencies and the same modulation frequency, representing different symbols for signal transmission, where the LFM carrier signal of each center frequency can represent two bits of binary information to improve transmission efficiency.

In one embodiment, in the process of serial/parallel conversion of data, a band-pass filter is used to process intra-carrier information of different sub-carriers to improve the signal-to-noise ratio.

Figure 5:
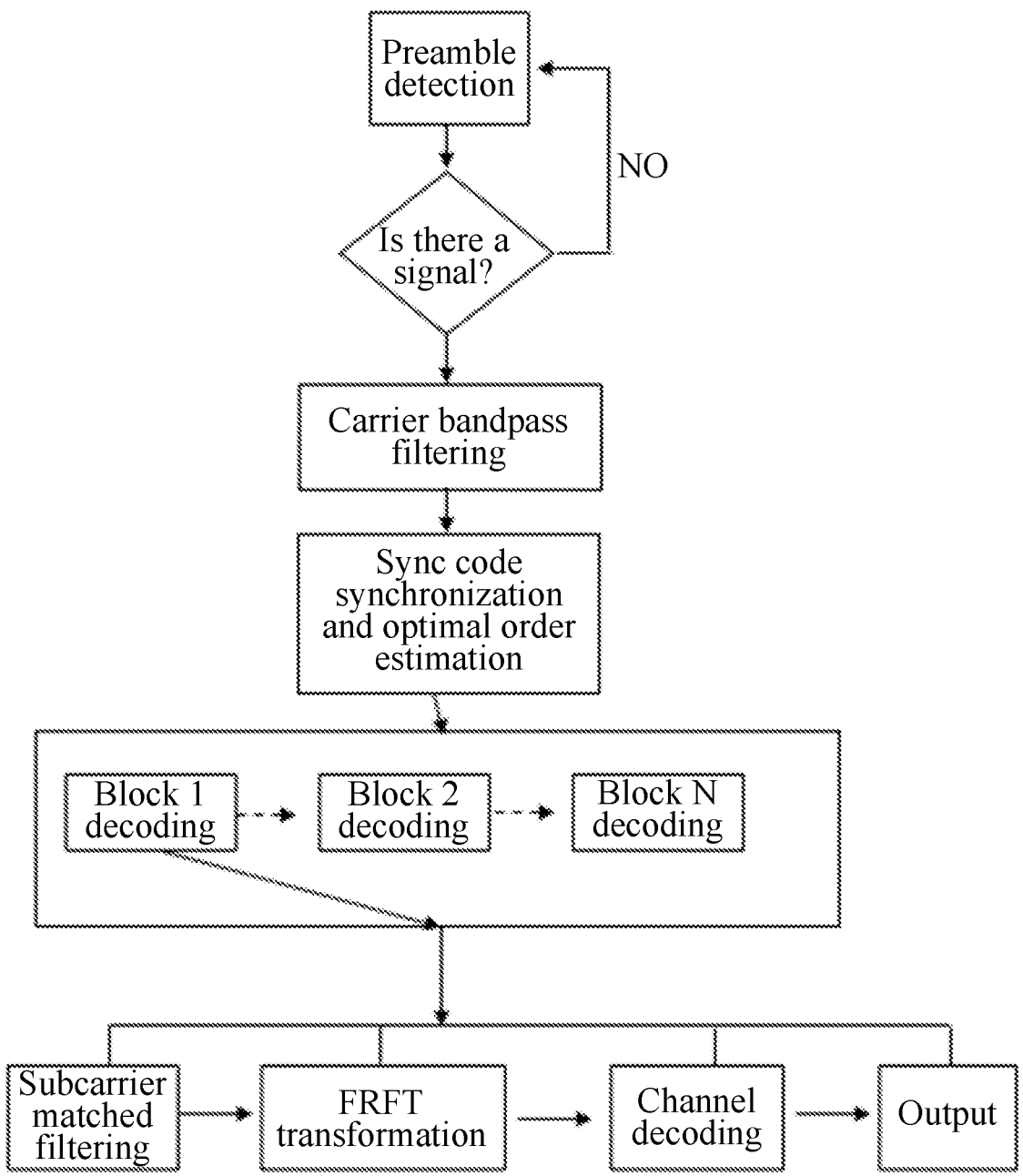
FIG. 5 is a flowchart of signal demodulation at the receiving end of the method and apparatus for underwater acoustic communication of the present disclosure.

In some embodiments, as shown in FIG. 5, step S2 includes:

S21: the underwater acoustic signal received by the receiving end is subjected to inverse transformation and modulation by an IQ modulator to obtain the data packet;

S22: the data packet is decomposed by the A/D converter; when the FPGA module detects the preamble information, the ARM module at the receiving end collects and saves the useful signal of the data packet;

S23: remove the guard interval from the collected data packet;

S24: perform data bit synchronization judgment according to the collected synchronization code data, and analyze the optimal order of the data code in the fractional order domain;

S25: perform a U-domain peak position search based on the optimal order, and demodulate the data code according to the QPSK constellation map mapping relationships and the position of the maximum point of the subcarrier;

S26: perform parallel/serial conversion and channel decoding on the demodulation result, and finally obtain the data output.

In some embodiments, step s24 specifically includes:

S241: use a window function to perform a windowing operation on the collected synchronization code data, thereby extracting synchronization code information;

S242: according to the effective frequency band range of the synchronization code information, perform matching filtering on the data packet containing the synchronization code information to obtain the filtered underwater acoustic synchronization signal $S_{bf}(i)$, where i represents the times of collecting the underwater acoustic synchronization signal.

S243: determine the initial angle of the synchronization signal in the U domain using the FRFT transformation angle $a_0$ used for FRFT modulation at the transmitting end;

$$a_0 = -\mathrm{atan}\left(\frac{f_s^2}{NK}\right);$$

in the formula, fs is the sampling frequency of the underwater acoustic synchronous signal captured by the receiving end, N is the number of sampling points, and K is the modulation frequency of the linear frequency modulation signal;

S244. Taking a center of $a_0$ and a step size of $\Delta d$ within the range of $\pm d$, iteratively calculate the amplitude peak value of the fractional Fourier transform under different orders for the filtered underwater acoustic time scale signal $S_{bf}(i)$.

In actual operation, take $a_0$ as the center, and take $\Box d$ as the step size, such as 0.001, within the range of $\pm d$, such as $\pm 5\%$, to iteratively calculate the amplitude peak value of fractional Fourier transform under different orders for the filtered synchronous signal $S_{bf}(i)$. Taking a center of a_0 and a step size of $\Delta d$ within the range of $\pm d$ 0.001, iteratively calculate the amplitude peak value of the fractional Fourier transform under different orders for the filtered underwater acoustic time scale signal $S_{bf}(i)$.

S245: obtain the corresponding optimal rotation angle $a_{opt}$ of the underwater acoustic synchronization signal under the fractional Fourier transform by determining the maximum amplitude peak of the signal with the optimal convergence in the U domain, and obtain the optimal order $p_{opt}$ of the underwater acoustic synchronous signal collected by the receiving end and the data code in the U domain using the transformation angle $$\alpha = \frac{p\pi}{2}, 0 < |p| < 2, 0 < |a| < \pi.$$

In some embodiments, step s25 specifically includes:

S251. Save the obtained optimal rotation angle $a_{opt}$ into a register, substitute the result of $a_{opt}$ into $a_0$ in the step S243 for iterative calculation when receiving the next packet of data frame. Since the relative time interval in the signal transmission process is relatively short and the underwater acoustic environment change is relatively stable, the search range of the signal in the U domain is reduced by multiple iterations of the optimal rotation angle $a_{opt}$.

S252. After removing the pilot signal, perform matched filtering on each subcarrier, use the optimal order $p_{opt}$ to search for the peak position in the U domain, and demodulate the data code according to the mapping relationships of the QPSK constellation map and the position of the maximum point of the subcarrier.

Figure 4:
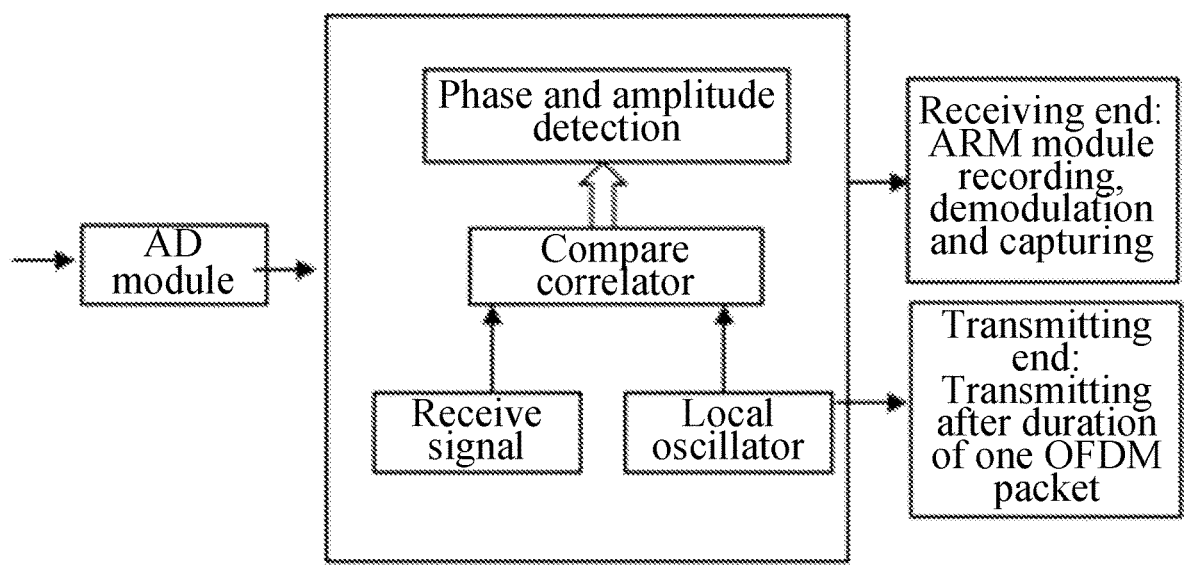
FIG. 4 is a schematic diagram of a preamble frame synchronization detection principle of a dual-core processing system of the method and apparatus for underwater acoustic communication of the present disclosure.

In some embodiments, as shown in FIG. 4, both the transmitting end and the receiving end adopt a dual-core processing mode. In particular, the FPGA is used as a processing core to process data specifically for the preamble. ARM is used as the processing core specially for the data processing of the receiving end and the sending end. Real-time recognition of the received underwater acoustic signal including the preamble is carried out under the condition of keeping normal data transmission and reception.

In the SIMO system, when the underwater acoustic signal is received by the transducer at the receiving end, the FPGA module in the system always detects the arrival of the preamble. Once the receiving end detects the preamble, the ARM module in the system starts to collect and record useful signals to be processed. Simultaneously, when the transmitting end sends data packets, once the FPGA module of the system detects that there is a preamble signal in the underwater acoustic channel, the transmitting end will transmit the signal after an interval of one OFDM data packet, thereby avoiding system demodulation confusion caused by signal superposition in the underwater acoustic channel.

For SIMO underwater acoustic communication, the communication method of the present disclosure achieves the recognition of the preamble, the data processing of the sending and receiving data packets, and the adjustment of the sending and receiving gap by using FPGA and ARM dual-core processing. At the same time, in the signal coding, the single-frequency signal is used as the preamble of the system capturing and carrier synchronization, and the anti-Doppler effect linear frequency modulation signal is used as the data code to realize the efficient transmission of the underwater acoustic signal through the QPSK modulation method. On the other hand, in the signal transmission mode, OFDM is used to perform signal analysis and data preprocessing on the synchronization codes with the same modulation frequency and different center frequencies during the demodulation process of the data codes, so as to realize the fast demodulation of the data code and improve the anti-noise, anti-multipath and anti-Doppler effects in the underwater acoustic environment, thereby realizing a high-speed underwater acoustic communication method.

Embodiment Two

FIG. 2 shows a block diagram of an apparatus for underwater acoustic communication provided by Embodiment two of the present disclosure. For ease of description, only the parts related to the embodiments of the present disclosure are shown, the details of which are as follows:

As shown in FIGS. 2 and 3, there is disclosed an apparatus for underwater acoustic communication, in which a data packet frame structure in the communication transmission according to the method includes: preamble, a synchronization code, and a data code. A guard interval is set between the preamble and the synchronization code. The preamble is used as the basis for the receiving end to judge the arrival of useful signals and prepare to receive data. The synchronization code adopts a linear frequency modulation signal having the same modulation frequency as and a different center frequency than the data code, as a synchronization detection signal of the useful signal arrival time T0 and the optimal order of receiving signals in the fractional domain. The data code comprises a plurality of different types of digital information modulated onto the linear frequency modulation signal.

The apparatus for underwater acoustic communication includes: a transmitting end, a receiving end, and an FPGA module electrically connected to the two.

The FPGA module is used to detect the preamble information and notify the transmitting end and the receiving end.

The transmitting end: performs channel coding and digital modulation on the data source to obtain the data code; inserts the preamble, the synchronization code and the guard interval before the data code to obtain the data packet; sends the data packet modulated to a carrier frequency having an orthogonal characteristic into an underwater acoustic channel through a transmission transducer.

The receiving end: performs inverse modulation on the received underwater acoustic signal to obtain the data packet; decomposes the data packet and captures and saves the useful signal based on the preamble; removes the guard interval and analyzes the optimal order of the data code in the fractional order domain according to the synchronization code; and demodulates the data code according to the optimal order to obtain data output.

In some embodiments, the transmitting end includes:

a coding modulation unit that performs channel coding and digital modulation on the data source to obtain serial data;

a data code generation unit that forms parallel data after serial/parallel conversion, and inserts pilot; where in the FRFT communication system, 00, 01, 10 and 11 in the QPSK modulation signals are respectively represented by four kinds of LFM carrier signals with different center frequencies, and after signal mapping is formed, IDFRFT is used to modulate the subcarrier to obtain the data code;

a guard interval insertion unit that adds the guard interval before the modulated data code through parallel/serial conversion;

a preamble unit that inserts a single-frequency signal before the guard interval as the preamble used as the basis for system collection;

a packing unit that inserts after the guard interval a linear frequency modulation signal having the same modulation frequency as and a different center frequency than the data code to serve as the synchronization code, and obtain the data packet after D/A conversion;

a carrier modulation unit that sends the data packet to an IQ modulator for modulation to a carrier frequency fc having an orthogonal characteristic, and then sends the modulated data packet to the underwater acoustic channel through the transmission transducer.

In some embodiments, as illustrated in the demodulation principle shown in FIG. 5, the receiving end includes:

a carrier demodulation unit that subjects the underwater acoustic signal received by the receiving end to inverse transformation and modulation by an IQ modulator to obtain the data packet;

an unpacking unit that decomposes the data packet through the A/D converter;

when the FPGA module detects the preamble information, the ARM module at the receiving end collects and saves the useful signal of the data packet;

a guard interval removal unit that removes the guard interval from the collected data packet;

a synchronization code analysis unit that performs data bit synchronization judgment according to the collected synchronization code data, and analyzes the optimal order of the data code in the fractional order domain;

a data code demodulation unit that performs a U-domain peak position search based on the optimal order, and demodulates the data code according to the mapping relationships of the QPSK constellation map and the position of the maximum point of the subcarrier;

a conversion decoding unit that performs parallel/serial conversion and channel decoding on the demodulation result, and finally obtains the data output.

In some embodiments, as shown in FIG. 4, the apparatus further includes:

a dual-core processing unit that is used to make the transmitting end and the receiving end in a dual-core processing mode. In particular, the FPGA is used as a processing core to process data specifically for the preamble. ARM is used as the processing core specially for the data processing of the receiving end and the sending end. Real-time recognition of the received underwater acoustic signal including the preamble is carried out under the condition of keeping normal data transmission and reception.

When the underwater acoustic signal is received by the transducer at the receiving end, the FPGA module always detects the arrival of the preamble. Once the FPGA module detects the preamble, the ARM module at the receiving end to collect and record useful signals to be processed. Simultaneously, the transmitting end will transmit the signal after an interval of one OFDM data packet, thereby avoiding system demodulation confusion caused by signal superposition in the underwater acoustic channel.

In the method and apparatus for underwater acoustic communication according to the embodiments of the present disclosure, based on the linear frequency modulation signal that has the same optimal order characteristics in the fractional order domain under the same frequency modulation frequency and different center frequencies, FRFT is used for the preprocessing of analysis of the data containing data synchronization codes, thereby realizing the fast interpretation of four groups of LMF signal symbol information in QPSK modulation. This method can not only well suppress the cross term and the Doppler influence existing in the background of reverberation and noise in the time-frequency analysis, but also has a fast calculation speed and reduces the complexity of the operation.

The foregoing merely illustrates some exemplary embodiments according to the present disclosure and is not intended to limit the present disclosure. Any modifications, equivalent replacements and improvements made within the spirit and principles of the present disclosure shall fall in the scope of protection of the present disclosure.

What is claimed is:

1. A method for underwater acoustic communication, wherein a data packet frame for communication transmission comprises a preamble, a synchronization code, and a data code; a guard interval is disposed between the preamble and the synchronization code; wherein the preamble is used as a basis for a receiving end to judge an arrival of a useful signal and prepare to receive data; the synchronization code adopts a linear frequency modulation (LFM) signal having an identical modulation frequency with and a different center frequency than the data code, and serves as a synchronization detection signal of an arrival time TO of the useful signal and an optimal order of receiving signals in a fractional domain; wherein the data code comprises a plurality of different types of digital information modulated onto the LFM signal;

wherein the method comprises:
S1: performing, by a transmitting end, channel coding and digital modulation on a data source to obtain the data code; inserting the preamble, the synchronization code, and the guard interval before the data code to obtain a data packet; and sending the data packet having been modulated to a carrier frequency having an orthogonal characteristic into an underwater acoustic channel through a transmission transducer;
S2: performing, by the receiving end, inverse modulation on a received underwater acoustic signal to obtain the data packet; decomposing the data packet and capturing and saving the useful signal based on the preamble; removing the guard interval and analyzing an optimal order of the data code in a fractional order domain according to the synchronization code; and demodulating the data code according to the optimal order to obtain a data output.

2. The method as recited in claim 1, wherein the S1 comprises:
S11: performing, by the transmitting end, channel coding and digital modulation on the data source to obtain serial data;
S12: performing serial/parallel conversion to obtain parallel data and inserting pilot information; in a Fractional Fourier Transform (FRFT) communication system, representing 00, 01, 10 and 11 in quadrature phase shift keying (QPSK) modulation signals respectively by four kinds of LFM carrier signals with different center frequencies, and after signal mapping is formed, using inverse discrete fractional Fourier transform (IDFRFT) to modulate a subcarrier to obtain the data code;
S13: adding the guard interval before the modulated data code through parallel/serial conversion;
S14: inserting a single-frequency signal before the guard interval as the preamble used as the basis for system capturing;
S15: inserting after the guard interval the LFM signal having an identical modulation frequency with and a different center frequency than the data code to serve as the synchronization code, and obtaining the data packet after D/A conversion;
S16: sending the data packet to an IQ modulator for modulation onto a carrier frequency fc having an orthogonal characteristic, and sending the modulated data packet to the underwater acoustic channel through the transmission transducer.

3. The method as recited in claim 2, wherein the S2 comprises:
S21: subjecting the underwater acoustic signal received by the receiving end to inverse transformation and modulation by the IQ modulator to obtain the data packet;
S22: decomposing the data packet by an A/D converter; in response to the field programmable logic gate array (FPGA) module detecting the preamble information, capturing and saving, by an ARM module at the receiving end, the useful signal of the data packet;
S23: removing the guard interval from the captured data packet;
S24: performing data bit synchronization judgment according to the captured synchronization code, and analyzing the optimal order of the data code in the fractional order domain;
S25: performing a U-domain peak position search based on the optimal order, and demodulating the data code according to mapping relationships of a quadrature phase shift keying (QPSK) constellation map and a position of a maximum point of the subcarrier;
S26: performing parallel/serial conversion and channel decoding on a demodulation result, and finally obtaining the data output.

4. The method as recited in claim 3, wherein the S24 comprises:
S241: using a window function to perform a windowing operation on the collected synchronization code, thereby extracting synchronization code information;
S242: according to an effective frequency band range of the synchronization code information, performing matching filtering on the data packet containing the synchronization code information to obtain a filtered underwater acoustic synchronization signal $S_{bf}(i)$, where i represents a number of times of collecting the underwater acoustic synchronization signal;

S243: determining an initial angle of the synchronization signal in the U-domain using an FRFT transformation angle $a_0$ used for FRFT modulation at the transmitting end;

$$a_0 = -\mathrm{atan}\left(\frac{f_s^2}{NK}\right);$$

wherein in the formula, fs stands for a sampling frequency of the underwater acoustic synchronous signal captured by the receiving end, N stands for a number of sampling points, and K stands for a modulation frequency of the LFM signal;

S244: taking $a_0$ as a center and $\Delta d$ as a step size within a range of $\pm d$, iteratively calculating an amplitude peak value of a fractional Fourier transform under different orders for the filtered underwater acoustic time scale signal $S_{bf}(i)$; and S245: obtaining a corresponding optimal rotation angle $a_{opt}$ of the underwater acoustic synchronization signal under the fractional Fourier transform by determining a maximum amplitude peak of the signal with an optimal convergence in the U domain, and obtaining the optimal order $p_{opt}$ of the underwater acoustic synchronous signal collected by the receiving end and the data code in the U domain using the transformation angle $$\alpha = \frac{p\pi}{2},\ 0<|p|<2,\ 0<|a|<\pi.$$

5. The method as recited in claim 4, wherein the S25 comprises:

S251: saving the obtained optimal rotation angle $a_{opt}$ into a register, substituting the result of $a_{opt}$ into $a_0$ in S243 for iterative calculation when receiving a next packet of data frame; since a relative time interval in the signal transmission process is relatively short and an underwater acoustic environment change is relatively stable, a search range of the signal in the U domain is reduced by multiple iterations of the optimal rotation angle $a_{opt}$;

S252: after removing the pilot signal, performing matched filtering on each subcarrier, using the optimal order $p_{opt}$ to search for the peak position in the U domain, and demodulating the data code according to the mapping relationships of the QPSK constellation map and the position of the maximum point of the subcarrier.

6. The method as recited in claim 5, wherein both the transmitting end and the receiving end adopt a dual-core processing mode;

wherein when the underwater acoustic signal is received by a transducer at the receiving end, the FPGA module in the system always detects the arrival of the preamble; once the receiving end detects the preamble, the ARM module in the system at the receiving end starts to collect and record useful signals to be processed; simultaneously, the transmitting end transmits the signal after an interval of one OFDM data packet, thereby avoiding confusion of system demodulation caused by signal superposition in the underwater acoustic channel.

7. An apparatus for underwater acoustic communication, wherein a data packet frame for communication transmission comprises a preamble, a synchronization code, and a data code; a guard interval is disposed between the preamble and the synchronization code; wherein the preamble is used as a basis for a receiving end to judge an arrival of a useful signal and prepare to receive data; the synchronization code adopts a linear frequency modulation (LFM) signal having an identical modulation frequency with and a different center frequency than the data code, and serves as a synchronization detection signal of an arrival time TO of the useful signal and an optimal order of receiving signals in a fractional domain; wherein the data code comprises a plurality of different types of digital information modulated onto the LFM signal;

wherein the apparatus comprises a transmitting end, a receiving end, and an FPGA module electrically connected to the two;

wherein the FPGA module is used to detect the preamble information and notify the transmitting end and the receiving end;

wherein the transmitting end is used to: perform channel coding and digital modulation on a data source to obtain the data code; insert the preamble, the synchronization code, and the guard interval before the data code to obtain a data packet; and send the data packet having been modulated to a carrier frequency having an orthogonal characteristic into an underwater acoustic channel through a transmission transducer; and wherein the receiving end is used to: perform inverse modulation on a received underwater acoustic signal to obtain the data packet; decompose the data packet and capture and save the useful signal based on the preamble; remove the guard interval and analyze an optimal order of the data code in a fractional order domain according to the synchronization code; and demodulate the data code according to the optimal order to obtain a data output.

8. The apparatus as recited in claim 7, wherein the transmitting end comprises:

a coding modulation unit used to perform channel coding and digital modulation on the data source to obtain serial data;

a data code generation unit used to: perform serial/parallel conversion to obtain parallel data, and insert pilot information; in a Fractional Fourier Transform (FRFT) communication system, represent 00, 01, 10 and 11 in the QPSK modulation signals respectively by four kinds of LFM carrier signals with different center frequencies, and after signal mapping is formed, use inverse discrete fractional Fourier transform (IDFRFT) to modulate a subcarrier to obtain the data code;

a guard interval insertion unit used to add the guard interval before the modulated data code through parallel/serial conversion;

a preamble unit used to insert a single-frequency signal before the guard interval as the preamble used as a basis for system capturing;

a packing unit used to insert after the guard interval the LFM signal having an identical modulation frequency with and a different center frequency than the data code to serve as the synchronization code, and obtain the data packet after D/A conversion;

a carrier modulation unit used to send the data packet to an IQ modulator for modulation to a carrier frequency fc having an orthogonal characteristic, and send the modulated data packet to the underwater acoustic channel through a transmission transducer.

9. The apparatus as recited in claim 8, wherein the receiving end comprises:

a carrier demodulation unit used to subject the underwater acoustic signal received by the receiving end to inverse transformation and modulation by the IQ modulator to obtain the data packet;

an unpacking unit used to decompose the data packet through an A/D converter; wherein in response to the FPGA module detecting the preamble information, an ARM module at the receiving end is used to capture and save the useful signal of the data packet;

a guard interval removal unit used to remove the guard interval from the captured data packet;

a synchronization code analysis unit used to perform data bit synchronization judgment according to the captured synchronization code data, and analyze the optimal order of the data code in the fractional order domain;

a data code demodulation unit used to perform a U-domain peak position search based on the optimal order, and demodulate the data code according to mapping relationships of a quadrature phase shift keying (QPSK) constellation map and a position of a maximum point of a subcarrier; and a conversion decoding unit used to perform parallel/serial conversion and channel decoding on a demodulation result, and finally obtain a data output.

10. The apparatus as recited in claim 9, further comprising:

a dual-core processing unit used to make the transmitting end and the receiving end be in a dual-core processing mode;

when the underwater acoustic signal is received by a transducer at the receiving end, the FPGA module always detects the arrival of the preamble; once the FPGA module detects the preamble, the ARM module at the receiving end starts to capture and record useful signals to be processed; simultaneously, the transmitting end transmits a signal after an interval of one OFDM data packet, thereby avoiding confusion of demodulation of the system caused by signal superposition in the underwater acoustic channel.

* * * * *